Dec. 13, 1955 R. LUKE 2,726,597
APPARATUS FOR MAKING POTATO CHIPS
Filed Oct. 27, 1952 3 Sheets-Sheet 1

INVENTOR.
ROY LUKE
BY Harold J. Downes
ATTORNEY

Dec. 13, 1955  R. LUKE  2,726,597
APPARATUS FOR MAKING POTATO CHIPS
Filed Oct. 27, 1952  3 Sheets-Sheet 2

INVENTOR.
ROY LUKE
BY Harold J. Downes
ATTORNEY

Dec. 13, 1955 R. LUKE 2,726,597
APPARATUS FOR MAKING POTATO CHIPS
Filed Oct. 27, 1952 3 Sheets-Sheet 3

INVENTOR.
ROY LUKE
BY Harold J. Downes
ATTORNEY

United States Patent Office 2,726,597
Patented Dec. 13, 1955

2,726,597
APPARATUS FOR MAKING POTATO CHIPS

Roy Luke, Lynwood, Calif.

Application October 27, 1952, Serial No. 317,013

1 Claim. (Cl. 99—405)

This invention relates to potato chips and particularly to an improved method and apparatus for making potato chips continuously.

In the past, potato chips have been made by the following process. Potatoes are peeled mechanically and are sliced into a water bath where a considerable portion of the starch content of the potato chips is removed. From the water bath the potato chips are removed mechanically and placed in a vat of boiling cooking oil where they are cooked for a few minutes and then packaged. It has been thought necessary to slice the potatoes into a water bath for two reasons—the first is that unless some means could be devised for assuring the proper dispersion of the slices of potatoes into the cooking oil the slices tend to adhere together and do not become properly cooked. The second apparent reason for slicing the potatoes into a water bath was the desire to remove from the surfaces of each chip all of the free starch which was considered undesirable because it tends to form a gum in the potato cooking vat and because cooking methods thus far devised were incapable of achieving a palatable chip from which a major portion of the starch had not been removed.

This invention contemplates a method of making palatable potato chips from sliced whole potatoes from which none of the starch has been removed, thereby effecting a considerable economy to the potato chip manufacturer. This invention contemplates in addition an improved apparatus for making potato chips continuously without the use of a water bath to separate the potato chips and remove the major portion of the edible starches therefrom.

This invention also contemplates an improved apparatus for handling edibles while they are being cooked in a hot fluid medium.

It is, therefore, an object of this invention to provide an improved potato chip making machine.

It is another object of this invention to provide an improved method of making potato chips continuously from sliced raw potatoes from which no portion of the starch has been removed.

It is another object of this invention to provide potato chip cooking apparatus of an improved and simplified design.

It is another object of this invention to provide potato chip cooking apparatus which may be easily disassembled and cleaned.

It is another object of this invention to provide potato chip cooking apparatus adapted to produce a uniform, thoroughly cooked potato chip.

It is another object of this invention to provide a potato chip cooking machine adapted to produce uniform potato chips continuously.

It is another object of this invention to provide the potato chip cooking machine incorporating means for conveying the cooking potato chips through the cooking medium continuously at the correct depth and speed for optimum cooking.

It is another object of this invention to provide an improved method of making potato chips wherein the potato chips are sliced directly into a cooking medium and are conveyed through the cooking medium at the optimum depth therein and speed therethrough in order to produce a superior potato chip.

It is another object of this invention to provide a potato chip making machine adapted to control accurately the depth of the cooking potato chips in a cooking medium.

It is another object of this invention to provide a potato chip cooking machine adapted to make potato chips continuously, including the steps of slicing, cooking, transporting, draining, and salting.

It is another object of this invention to provide in a potato chip cooking machine, a rotary transport device incorporating a novel construction permitting quick and easy disassembly of the device.

Other objects of invention will become apparent from the following description taken in connection with the accompanying drawings in which.

Figure 1:
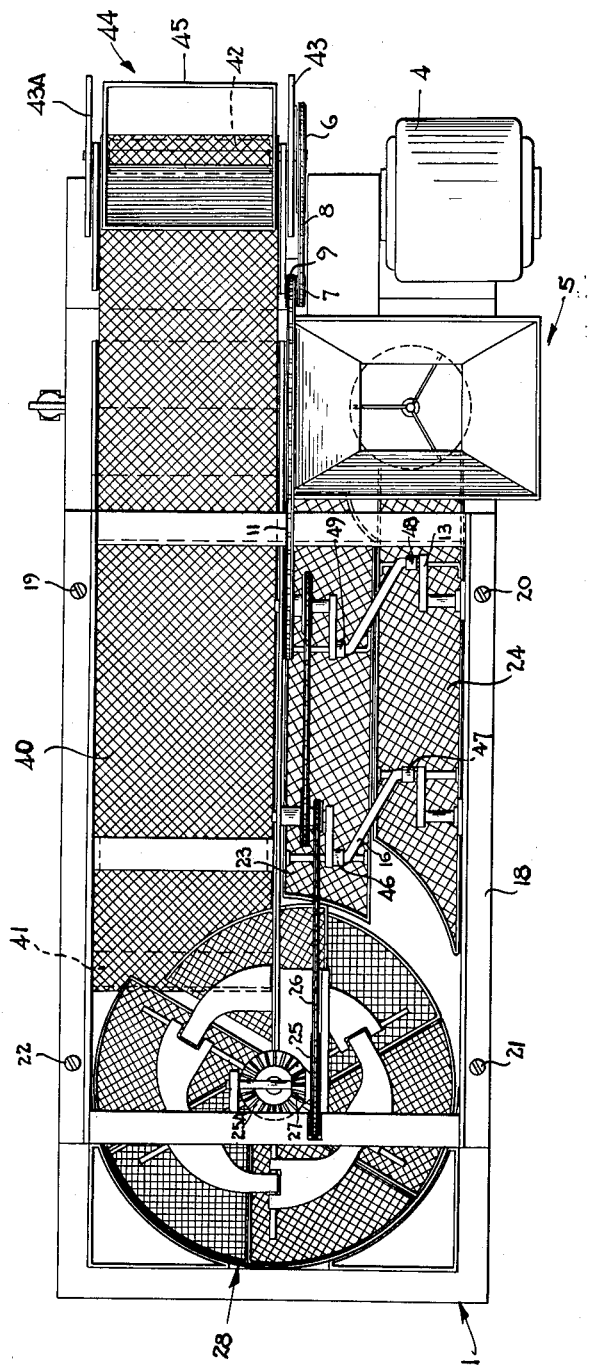
Fig. 1 is a plan view of the invention.
Figure 2:
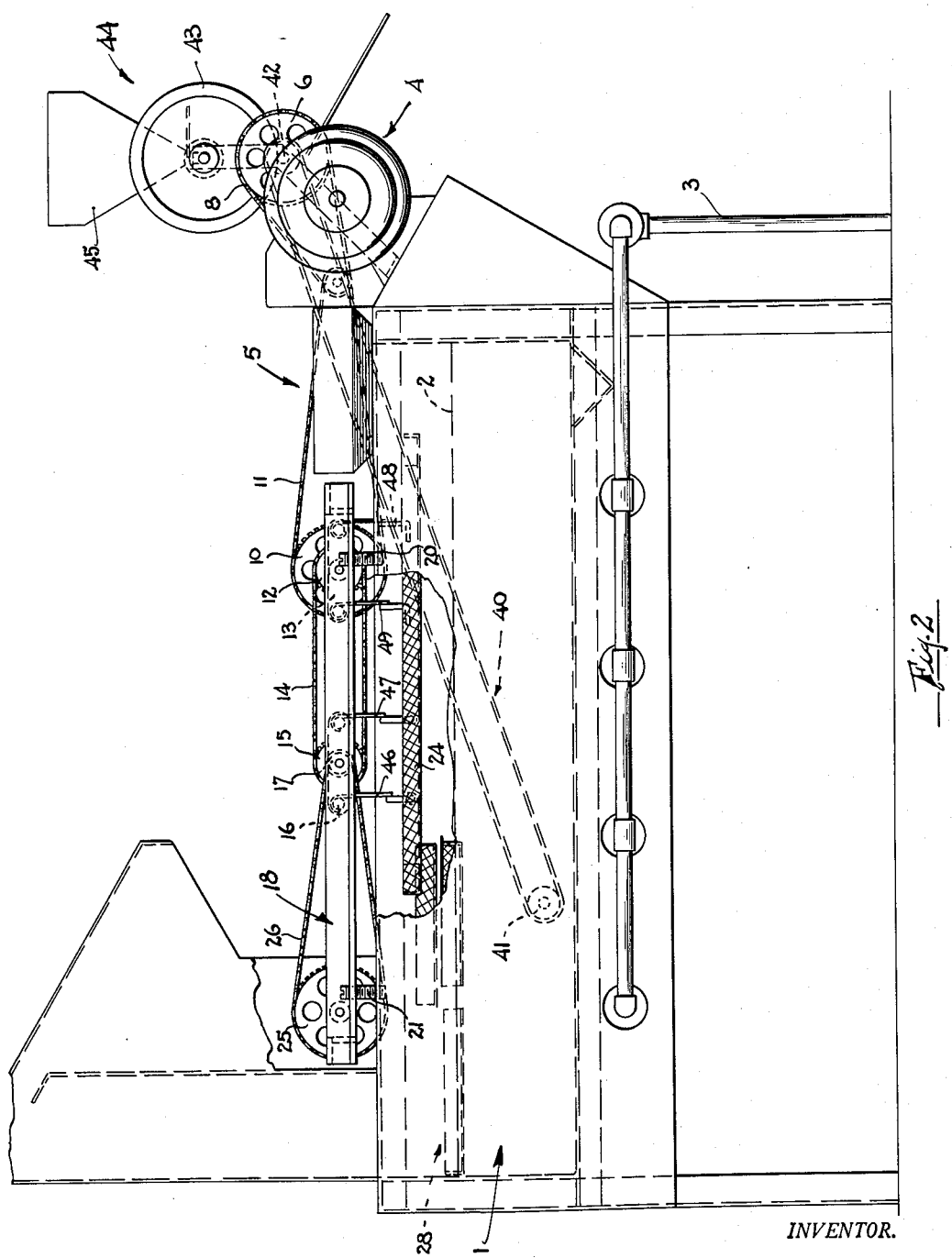
Fig. 2 is an elevational view of the invention.

Referring to the drawing and particularly to Figs. 1 and 2 there is shown a tank 1 of generally rectangular shape, containing a cooking medium 2 such as vegetable oil or a shortening of some type. Heat is applied to the bottom of tank 1 by any suitable means such as gas conduit 3 which feeds a plurality of burners on the under side of the tank. Supported at one end of tank 1 is a motor 4 which drives a rotary slicer 5 which is used to slice potatoes into cooking medium 2. As is shown in Fig. 1 the potatoes are sliced into cooking medium at the lower right hand corner of the tank in Fig. 1. Motor 4 is connected to drive gears 6 and 7 by means of drive chain 8. Gear 7 is shaft connected to gear 9 which in turn, drives gear 10 by means of drive chain 11. Gear 10 is shaft connected to gear 12 which is connected to crank shaft 13. Gear 12 is connected by means of chain belt 14 to gear 15 which drives crank shaft 16 and gear 17. Crank shafts 13 and 16, as well as all of the aforementioned gears are supported upon frame member 18 which may be adjusted in height by means of screws 19, 20, 21 and 22. Crank shafts 13 and 16 carry walking baskets 23 and 24 as shown so that as crank shafts 13 and 16 rotate the walking baskets describe an oscillatory movement. These walking baskets are of mesh material and are shaped to retain the cooking potato chips underneath them. Gear 17 drives gear 25 by means of chain belt 26. Gear 25 in turn is shaft connected to gear 25a which meshes with gear 27 to drive circular basket wheel 28 which is comprised of baskets 29, 30, 31, 32, 33 and 50.

Figure 3:
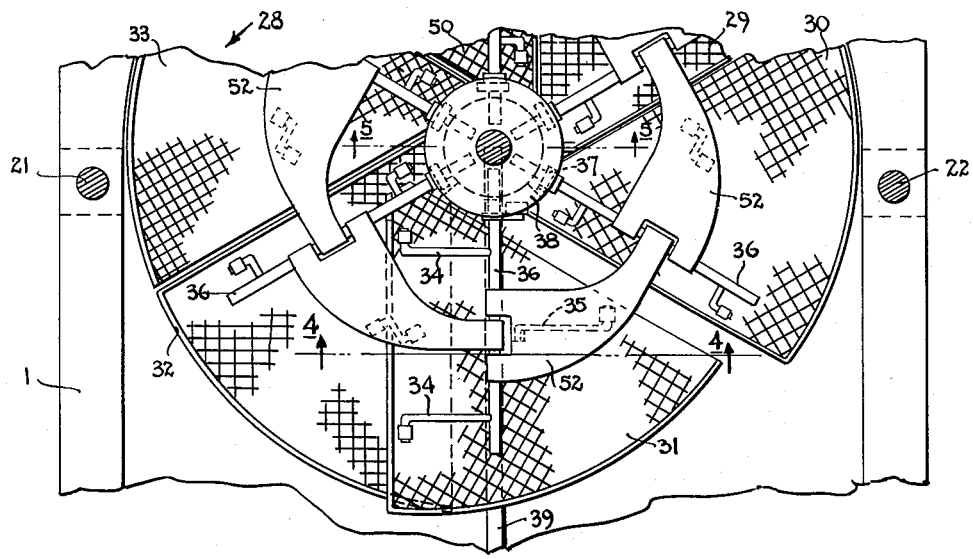
Fig. 3 is an enlarged fragmentary plan view of the invention.
Figure 4:
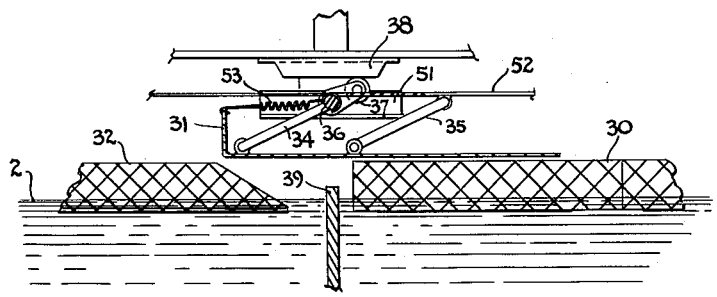
Fig. 4 is a sectional view of the invention taken at 4—4 in Fig. 3.

Referring now to Figs. 3, 4, 5, and 6, the details of basket wheel 28 are shown. Each basket, such as basket 31, is supported upon rotatable connecting rods 34 and 35 as shown in Figs. 3 and 4, so that the basket may be raised and lowered. Connecting rod 35 is rotatably supported by plate 52 while connecting rods 34 are integral with shaft 36 which also carries cam follower 37 which rides on cam 38. All rods are free to rotate with respect to the basket. Each basket has associated with it a set of connecting rods, similar to rods 34 associated with basket 31, a support shaft similar to shaft 36 and a cam follower similar to cam follower 37. Rotation of gear 27 causes basket wheel 28 to rotate carrying with it the baskets and their associated supports and shafts. Cam 38, however, remains stationary so that as basket 31 is caused to rotate each cam follower is moved successively by the cam, causing each shaft to rotate as the follower encounters the cam. As each shaft rotates, it raises its associated basket out of the cooking medium as shown in Figs. 3 and 4, plates 52 serve as supports for connecting rods 35 and do not themselves move as shown in Fig. 4 when cam follower 37 rides on the raised portion of cam 38 the baskets are raised out of the cooking oil placing spring 53 in tension. When the cam follower encounters the unraised portion of the cam, the basket drops, due to gravity and the action of spring 53. It will be noted that when the basket is lowered the spring is in less tension because spring 53 and rod 34 are more nearly in line at that time.

Referring now to Fig. 1, cam 38 is so disposed as to cause each basket to rise out of the cooking medium a sufficient amount to pass over bulkhead 39 which separates tank 1 into two longitudinal parallel compartments for a major portion of its length. Conveyor belt 40, preferably made of some type of screen or interlocking mesh material of a flexible nature, is caused to move upon separate mandrels 41 and 42 in order to transport the potato chips from the cooking medium to be salted. It will be noted from Fig. 2 that conveyor belt 40 is immersed in a cooking medium at its left end but is emergent therefrom for a considerable portion of its length in order to provide proper opportunity for the potato chips to drain and dry without wasting cooking oil excessively. Mandrel 42 is, of course, driven by motor 4 and the drive shafts of mandrel 42 are frictionally engaged by wheels 43 and 43a of mechanical salter 44. Salter 44 incorporates a hopper 45 for containing salt, which salt is caused to be dropped upon the potato chips carried by conveyor belt 40 as the potato chips pass off the end of the conveyor belt.

In operation, cooking oil is placed in tank 1 to a level such that walking baskets 23 and 24 and the baskets of basket wheel 28 are immersed at the correct depth, for example, from ¼″ to ⅜″ in the cooking oil at their lowest point of travel. The whole potato chip conveying assembly may be adjusted vertically by rotation of screws 19, 20, 21 and 22. It has been discovered that most effective cooking can be obtained if the chips are caused to be maintained approximately at this level in the cooking oil while they are cooking. If they are immersed greater depths than this they become doughy. If they are not immersed at least this distance, the upper side thereof may not become thoroughly cooked.

As soon as the cooking oil is up to temperature, motor 4 is started and potatoes are fed to slicer 5 which slices them individually, paying the slices into the cooking oil. Inasmuch as motor 4 has been started, walking baskets 23 and 24 are in motion in the sense necessary to kick the oil and cooking potato chips to the left in Fig. 1 where they are transported by basket wheel 28 which rotates in a clockwise direction, conveying the oil and potato chips slowly in the same direction. The chips are kept submerged because they are always underneath the baskets. Thus it can be seen that the oil is in continuous circulation and that it is thus highly improbable if not virtually impossible, that individual potato chips stick together in the process of cooking. The potato chips are then fed from the slicer into the hot oil and are transported by walking baskets 23 and 24 to the position where they may be kept immersed by the baskets of basket wheel 28 and transported to the upper left area of the tank as shown in Fig. 1. By this time, the chips are thoroughly cooked but remain in motion inasmuch as each time one of baskets 29, 30, 31, 32, 33 or 50 reaches bulkhead 39 it lifts up, crosses over the bulkhead and again becomes immersed in the cooking oil. Since the oil is still in motion it carries the potato chips on the conveyor belt 40 which lifts the potato chips out of the oil and allows them to drain while they are being transported to the end of the conveyor belt where they are dumped into any suitable container. Salter 44 meanwhile drops salt on the chips as they reach the end of the conveyor belt.

As may be deduced from the foregoing, the machine of this invention is particularly well suited to operation in store windows or in other locations where freshly made potato chips are in demand since the device operates continuously and automatically without an appreciable amount of supervision.

The construction of walking baskets 23 and 24 and basket wheel 28 lends itself to convenient disassembly and assembly for the purpose of cleaning, this being a highly important factor in this type of machine due to the fact that sanitary considerations require frequent cleaning. It will be noted that walking baskets 23 and 24 may be removed readily inasmuch as they are supported upon crank shafts 13 and 16 by open ended straps 46, 47, 48 and 49. Likewise, baskets 29, 30, 31, 32, 33 and 50 may be readily removed for cleaning and service by removing each of shafts 36 from its support in hub member 51.

Figure 5:
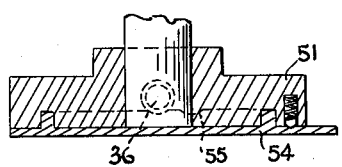
Fig. 5 is a sectional view of the invention taken at 5—5 in Fig. 3.
Figure 6:
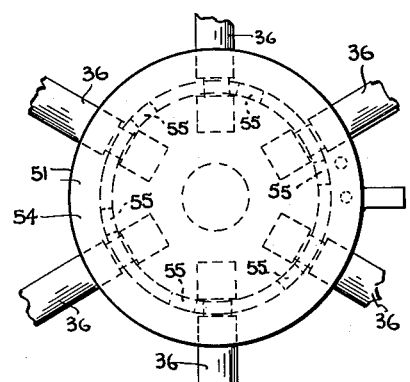
Fig. 6 is a bottom view of the basket wheel hub of this invention.

Referring to Figs. 5 and 6, shaft 36 is normally held in place because end ring 54 is angularly displaced so that groove 55 does not appear opposite the groove in shaft 36. The shaft is thus securely locked in place. To remove the shaft it is only necessary to rotate the ring until groove 55 apepars opposite shaft 36 allowing the end of the shaft to slide by ring 54.

Although the invention has been described and illustrated in detail, the same is to be taken by way of illustration and example only, the spirit and scope of the invention being limited only by the terms of the appended claim.

I claim:

Apparatus for continuously making potato chips comprising a rectangular tank having a longitudinally centrally disposed bulkhead extending throughout approximately the central one-half of said tank, cooking oil in said tank, a mechanical slicer for feeding slices of raw potato into said tank at one end thereof, a plurality of rectangular perforated baskets disposed in said tank adjacent said slicer and extending toward the opposite end of said tank, means for reciprocating said baskets longitudinally of said tank to keep said slices submerged in said oil while conveying them along said tank toward the opposite end thereof from said slicer, a plurality of sector shaped baskets located about a vertical axis near the end of said bulkhead farthest from said slicer, a shaft on said vertical axis, a circular cam of predetermined contour facing downward and fixed to the upper end of said shaft, a hub rotatable on said shaft below said cam, a plurality of cam follower shafts extending radially from and rotatably supported by said hub, cam followers contacting said cam and connected to rotate each of said radially extending cam follower shafts in accordance with the contour of said cam as said hub is rotated and connecting rod means connecting each of said baskets to one of said cam follower shafts for causing said baskets to lift out of said oil to clear said bulkhead as each one passes said bulkhead, means for rotating said baskets and said hub in the direction necessary to convey said slices around the end of said bulkhead and perforated conveyor belt means operated with one end thereof submerged in said tank on the opposite side of said bulkhead from said slicer and emergent from said tank on a gradual incline whereby potato chips may be produced continuously from whole raw potatoes.

References Cited in the file of this patent
UNITED STATES PATENTS

| | | |
|---|---|---|
| Re. 21,457 | Carpenter | May 21, 1940 |
| 1,086,248 | Varian | Feb. 3, 1914 |
| 1,599,916 | Nye | Sept. 14, 1926 |
| 1,629,355 | Morrow | May 17, 1927 |
| 2,056,884 | Brunstetter | Oct. 6, 1936 |
| 2,251,111 | Brown | July 29, 1941 |
| 2,549,283 | Ashton | Apr. 17, 1951 |
| 2,552,441 | McBeth | May 8, 1951 |